(12) United States Patent
Shiomi

(10) Patent No.: US 7,920,114 B2
(45) Date of Patent: Apr. 5, 2011

(54) DRIVING DEVICE FOR DISPLAY PANEL, DISPLAY PANEL, DISPLAY DEVICE INCLUDING THE DRIVING DEVICE, AND METHOD FOR DRIVING DISPLAY PANEL

(75) Inventor: Makoto Shiomi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 881 days.

(21) Appl. No.: 11/720,058

(22) PCT Filed: Dec. 1, 2005

(86) PCT No.: PCT/JP2005/022091
§ 371 (c)(1),
(2), (4) Date: May 23, 2007

(87) PCT Pub. No.: WO2006/070559
PCT Pub. Date: Jul. 6, 2006

(65) Prior Publication Data
US 2009/0225103 A1  Sep. 10, 2009

(30) Foreign Application Priority Data
Dec. 27, 2004  (JP) ................................. 2004-377853

(51) Int. Cl.
G09G 3/36 (2006.01)
G09G 5/02 (2006.01)
(52) U.S. Cl. .......................................... 345/88; 345/695
(58) Field of Classification Search .................. 345/690, 345/88, 695; 349/106, 108, 109, 111; 315/500, 315/169.3
See application file for complete search history.

(56) References Cited

U.S. PATENT DOCUMENTS

| 5,117,298 A | 5/1992 | Hirai | |
|---|---|---|---|
| 6,688,604 B2* | 2/2004 | Hashimoto | 277/558 |
| 6,891,522 B2* | 5/2005 | Song et al. | 345/87 |
| 7,483,095 B2* | 1/2009 | Roth et al. | 349/106 |
| 2004/0046725 A1* | 3/2004 | Lee | 345/88 |
| 2004/0174389 A1* | 9/2004 | Ben-David et al. | 345/694 |
| 2005/0068281 A1* | 3/2005 | Shin et al. | 345/88 |
| 2005/0225575 A1* | 10/2005 | Brown Elliott et al. | 345/694 |

FOREIGN PATENT DOCUMENTS

| JP | 01-094389 A | 4/1989 |
|---|---|---|
| JP | 02-083527 A | 3/1990 |
| JP | 02-118521 A | 5/1990 |
| JP | 02-245733 A | 10/1990 |
| JP | 09-251160 A | 9/1997 |
| JP | 11-295717 A | 10/1999 |
| JP | 2002-149117 A | 5/2002 |
| JP | 2003-216124 A | 7/2003 |

OTHER PUBLICATIONS

International Search Report for PCT Application No. PCT/JP2005/022091; mailed on Jan. 24, 2006.

* cited by examiner

*Primary Examiner* — Kevin M Nguyen
(74) *Attorney, Agent, or Firm* — Keating & Bennett, LLP

(57) ABSTRACT

A display panel is designed such that a pixel including sub-pixels indicative of red (R), green (G), blue (B) and at least one other color includes two sub-pixels at least in a longitudinal scanning direction and a color filter is provided for each of the sub-pixels. A driving device for the display panel includes a polarity reversal control section for performing polarity reversal drive with respect to every two dots in a lateral scanning direction and for performing polarity reversal drive with respect to every two lateral lines in a longitudinal scanning direction.

6 Claims, 13 Drawing Sheets

FIG. 8 (a)

| R | Y |
|---|---|
| B | G |

FIG. 8 (b)

| R | CN |
|---|----|
| B | G  |

FIG. 8 (c)

| R | M |
|---|---|
| B | G |

FIG. 9 (a)

| R | G | B  |
|---|---|----|
| Y | W | CN |

FIG. 9 (b)

| Y | W | CN |
|---|---|----|
| R | G | B  |

FIG. 9 (c)

| R | W | CN |
|---|---|----|
| Y | B | G  |

FIG. 9 (d)

| Y | B | G  |
|---|---|----|
| R | W | CN |

FIG. 9 (e)

| R  | W | Y |
|----|---|---|
| CN | B | G |

FIG. 9 (f)

| CN | B | G |
|----|---|---|
| R  | W | Y |

FIG. 11(a)

| R | Y | B | G |
|---|---|---|---|
| B | G | R | Y |
| R | Y | B | G |
| B | G | R | Y |

FIG. 11(b)

| R | CN | B | G |
|---|----|---|---|
| B | G  | R | CN |
| R | CN | B | G |
| B | G  | R | CN |

FIG. 11(c)

| R | M | B | G |
|---|---|---|---|
| B | G | R | M |
| R | M | B | G |
| B | G | R | M |

FIG. 12 (a)

| R | G | B | R | G | B |
|---|---|---|---|---|---|
| Y | W | CN | Y | W | CN |
| R | G | B | R | G | B |
| Y | W | CN | Y | W | CN |

FIG. 12 (b)

| R | W | CN | R | W | CN |
|---|---|---|---|---|---|
| Y | B | G | Y | B | G |
| R | W | CN | R | W | CN |
| Y | B | G | Y | B | G |

FIG. 12 (c)

| R | W | Y | R | W | Y |
|---|---|---|---|---|---|
| CN | B | G | CN | B | G |
| R | W | Y | R | W | Y |
| CN | B | G | CN | B | G |

FIG. 13 (a)

| R | G | B | Y | W | CN |
|---|---|---|---|---|----|
| Y | W | CN | R | G | B |
| R | G | B | Y | W | CN |
| Y | W | CN | R | G | B |

FIG. 13 (b)

| R | W | CN | Y | B | G |
|---|---|----|---|---|---|
| Y | B | G | R | W | CN |
| R | W | CN | Y | B | G |
| Y | B | G | R | W | CN |

FIG. 13 (c)

| R | W | Y | CN | B | G |
|---|---|---|----|---|---|
| CN | B | G | R | W | Y |
| R | W | Y | CN | B | G |
| CN | B | G | R | W | Y |

DRIVING DEVICE FOR DISPLAY PANEL, DISPLAY PANEL, DISPLAY DEVICE INCLUDING THE DRIVING DEVICE, AND METHOD FOR DRIVING DISPLAY PANEL

TECHNICAL FIELD

The present invention relates to (i) a driving device for a display panel in which a pixel including sub-pixels indicative of red (R), green (G), blue (B), and at least one other color includes N (N is an integer of two or more) sub-pixels at least in a longitudinal scanning direction and a color filter is provided for each of the sub-pixels, (ii) the display panel, (iii) a display device including the driving device, and (iv) a method for driving the display panel.

BACKGROUND ART

As shown in Japanese Unexamined Patent Publication No. 118521/1990 (Tokukaihei 2-118521; published on May 2, 1990) for example, a conventional liquid crystal display device uses a technique such that: a color filter indicative white (W) is provided in addition to color filters indicative of red (R), green (G), and blue (B) so that the color filters constitute one block, and the color filters are pattern-arranged using the block as a unit, allowing luminance to be improved. In the liquid crystal display device, for example, white light is emitted from a backlight such as a fluorescent lamp, passes through a liquid crystal to change its transmittance, and passes through color filters indicative of red (R), green (G) and blue (B), so that a color image is recognized by human eyes. Light having passed through the color filters reduces a considerable amount of luminance. For that reason, by adding a color filter indicative of white to one block, it is possible to increase luminance of light emitted by one block.

Examples of a pattern arrangement for the sub-pixels indicative of red (R), green (G), blue (B), and white (W) include a matrix pattern arrangement in which the sub-pixels are arranged in a matrix pattern as shown in FIG. 15(a) and a stripe pattern arrangement in which the sub-pixels are arranged in a stripe pattern as shown in FIG. 15(b).

Assume that, in a conventional arrangement, one block, that is, one pixel allows three sub-pixels indicative of red (R), green (G), and blue (B) to output luminance corresponding to 1. In contrast, in the matrix pattern arrangement or the stripe pattern arrangement for four colors, one pixel allows three sub-pixels indicative of red (R), green (G), and blue (B) occupying ¾ of an area of the block to output luminance corresponding to ¾, and allows a sub-pixel of white occupying ¼ of the area to output luminance three times as large as the luminance outputted by the three sub-pixels. Consequently, total luminance outputted by the one pixel is (¾)×1+(¼)×3=3/2. Therefore, as a whole, it is possible to make brightness of one pixel larger than that of one pixel in the conventional arrangement by 50%.

As shown in FIGS. 5(a) and 5(b) which are explanatory drawings of the present invention, each sub-pixel of a liquid crystal display panel includes a TFT (Thin Film Transistor) element 6. A drain of the TFT element 6 is connected with a pixel electrode 7 of each sub-pixel.

As shown in FIG. 6 which is an explanatory drawing of the present invention, a parasitic capacitance Cgd exists between a gate and the drain of the TFT element 6. Consequently, when the gate of the TFT element 6 is OFF, a pixel voltage is led in (a pixel voltage decreases) by ΔV due to the parasitic capacitance Cgd.

Therefore, as shown in FIG. 7 which is an explanatory drawing of the present invention, a voltage applied on the pixel electrode is lower than a written voltage (voltage supplied to a data signal line) by ΔV.

A liquid crystal must be driven with an alternative current and therefore a TFT liquid crystal display device adopts a frame-reversal drive scheme, a dot-reversal drive scheme, or other schemes. A voltage corresponding to a potential difference between a counter electrode voltage and a pixel electrode voltage is applied on a liquid crystal. However, a pixel electrode voltage is lower than a written voltage by ΔV both at a time of + polarity and at a time of − polarity, resulting in difference in an absolute value of a voltage applied on a liquid crystal layer 3 between the + polarity and the − polarity. Consequently, luminance differs between the time of + polarity and the time of − polarity. As a result, flickers are generated.

A conventional driving device for a display panel and a display device including the driving device are premised on even-numbered sub-pixels as shown in FIGS. 15(a) and 15(b). Consequently, in a stripe pattern arrangement in FIG. 15(b) for example, flickers are generated in which a stripe pattern is recognized in a lateral scanning direction when one color is displayed all over a screen. In a matrix pattern arrangement in FIG. 15(a), flickers are generated all over the screen.

See a sub-pixel indicative of red (R) for example in the matrix pattern arrangement. Assume that, in one frame, all sub-pixels indicative of red (R) have + polarity and an absolute value of a voltage applied on a liquid crystal is 3V for example due to a lead-in voltage, which is recognized as shown in FIG. 16(a).

On the other hand, assume that, in a next frame, all sub-pixels indicative of red (R) have − polarity and an absolute value of a voltage applied on the liquid crystal is 4V for example due to a lead-in voltage. Consequently, as shown in FIG. 16(a), red (R) is emphasized, and an image on a screen is recognized as reddish as a whole. As frames proceed, the display in FIG. 16(a) and the display in FIG. 16(b) are repeated alternatively, which is recognized by human eyes as flickers. The same can be said about other colors. For example, an image in a certain frame is recognized as bluish.

Polarity reversal drive control of a liquid crystal is disclosed in Japanese Unexamined Patent Publication No. 149117/2002 (Tokukai 2002-149117; published on May 24, 2002), Japanese Unexamined Patent Publication No. 83527/1990 (Tokukaihei 2-83527; published on Mar. 23, 1990), and Japanese Unexamined Patent Publication No. 94389/1989 (Tokukaihei 1-94389; published on Apr. 13, 1989). However, none of them discloses a relationship between the polarity reversal drive control of a liquid crystal and a pattern arrangement of color filters.

The present invention was made in view of the foregoing problems. An object of the present invention is to provide (i) a driving device for a display panel, (ii) a display panel, (iii) a display device including the driving device, and (iv) a method for driving the display panel, each of which allows for preventing flickers which are caused because color is emphasized or not in a whole screen.

DISCLOSURE OF INVENTION

In order to solve the foregoing problems, a driving device of the present invention is a driving device for a display panel in which a pixel including sub-pixels indicative of red (R), green (G), blue (B) and at least one other color includes N (N is an integer of two or more) sub-pixels at least in a longitudinal scanning direction, and a color filter is provided for each of the sub-pixels, said driving device including reversal control means for performing polarity reversal drive with respect to every one dot in a lateral scanning direction and for performing polarity reversal drive with respect to every N lateral lines in a longitudinal scanning direction.

Further, in order to solve the foregoing problems, a method of the present invention is a method for driving a display panel in which a pixel including sub-pixels indicative of red (R), green (G), blue (B) and at least one other color includes N (N is an integer of two or more) sub-pixels at least in a longitudinal scanning direction, and a color filter is provided for each of the sub-pixels, said method comprising the step of performing polarity reversal drive with respect to every one dot in a lateral scanning direction and of performing polarity reversal drive with respect to every N lateral lines in a longitudinal scanning direction.

Note that, the size of one dot is equal to that of one pixel in a lateral direction. The size of N lateral lines is equal to that of N sub-pixels in a longitudinal direction.

With the invention, a pixel including sub-pixels indicative of red (R), green (G), blue (B) and at least one other color includes N (N is an integer of two or more) sub-pixels at least in a longitudinal scanning direction and a color filter is provided for each of the sub-pixels. The reason is as follows. If sub-pixels are multicolored (a color other than red (R), green (G), and blue (B) is added) in a stripe pattern arrangement, luminance is improved as with the above arrangement, but it is difficult to keep good balance of luminance because the same color is arranged in one column. At that time, sub-pixels are multicolored and the number of the sub-pixels is increased, which tends to conversely drop compactness (fineness) of an image. Further, reversal drive for the stripe pattern arrangement is the same as conventional drive in that one input signal corresponds to one color filter of the stripe pattern arrangement at least in a longitudinal direction. For that reason, although one-dot and one-lateral line reversal drive is possible based on the same idea as the present invention, the drive is technically identical with a line reversal drive.

In the color filters with the above arrangement, when polarity reversal drive is performed with respect to every one dot in a lateral scanning direction and polarity reversal drive is performed with respect to every one lateral line in a longitudinal scanning direction, a lead-in voltage due to parasitic capacitance between a gate and a drain of a TFT (Thin Film Transistor) causes flickers in which a whole screen becomes reddish or bluish with respect to each frame.

In the present invention, the reversal control section performs polarity reversal drive with respect to every one dot in a lateral scanning direction and performs polarity reversal drive with respect to every N lateral lines in a longitudinal scanning direction. Consequently, one frame includes + polarity and − polarity with respect to each color. A next frame includes + polarity and − polarity with respect to each color, too. As a result, the present invention is not designed such that each color is emphasized or not with respect to each frame. Instead, the present invention is designed such that each frame averagely includes a portion where color is emphasized and a portion where color is not emphasized, resulting in each frame displaying average brightness of the color in a whole screen.

Therefore, it is possible to provide a driving device for a display panel and a method for driving the display panel, each of which allows for preventing flickers which are caused because color is emphasized or not in a whole screen. The present invention is effective to color filters which constitute one block corresponding to one pixel.

Further, in order to solve the foregoing problems, a driving device of the present invention for a display panel is a driving device for a display panel in which a pixel including sub-pixels indicative of red (R), green (G), blue (B) and at least one other color includes N (N is an integer of two or more) sub-pixels at least in a longitudinal scanning direction, and a color filter is provided for each of the sub-pixels, said driving device including reversal control means for performing polarity reversal drive with respect to every two dots in a lateral scanning direction and for performing polarity reversal drive with respect to every N lateral lines in a longitudinal scanning direction.

Further, in order to solve the foregoing problems, a method of the present invention for driving a display panel is a method for driving a display panel in which a pixel including sub-pixels indicative of red (R), green (G), blue (B) and at least one other color includes N (N is an integer of two or more) sub-pixels at least in a longitudinal scanning direction, and a color filter is provided for each of the sub-pixels, said method comprising the step of performing polarity reversal drive with respect to every two dots in a lateral scanning direction and of performing polarity reversal drive with respect to every N lateral lines in a longitudinal scanning direction.

Note that, the size of two dots is equal to that of two pixels in a lateral direction. The size of N lateral lines is equal to that of N sub-pixels in a longitudinal direction.

The invention is premised on that a pixel includes sub-pixels indicative of red (R), green (G), blue (B) and at least one other color includes N (N is an integer of two or more) sub-pixels at least in a longitudinal scanning direction, and a color filter is provided for each of the sub-pixels.

In the color filters with the above arrangement, when polarity reversal drive is performed with respect to every one dot in a lateral scanning direction and polarity reversal drive is performed with respect to every one lateral line in a longitudinal scanning direction, a lead-in voltage due to parasitic capacitance between a gate and a drain of a TFT (Thin Film Transistor) causes flickers in which a whole screen becomes reddish or bluish with respect to each frame.

In the present invention, the reversal control section performs polarity reversal drive with respect to every two dots in a lateral scanning direction and performs polarity reversal drive with respect to every N lateral lines in a longitudinal scanning direction. Consequently, one frame includes + polarity and − polarity with respect to each color. A next frame includes + polarity and − polarity with respect to each color, too. As a result, the present invention is not designed such that each color is emphasized or not with respect to each frame. Instead, the present invention is designed such that each frame averagely includes a portion where color is emphasized and a portion where color is not emphasized, resulting in each frame displaying average brightness of the color in a whole screen.

Therefore, it is possible to provide a driving device for a display panel and a method for driving the display panel, each of which allows for preventing flickers which are caused because color is emphasized or not in a whole screen. The present invention is effective to color filters which constitute one block corresponding to four pixels.

Further, in order to solve the foregoing problems, a driving device of the present invention for a display panel is a driving device for a display panel in which a pixel including sub-pixels indicative of red (R), green (G), blue (B) and at least one other color includes a plurality of sub-pixels at least in a longitudinal scanning direction, and a color filter is provided for each of the sub-pixels, the color filters constituting one block corresponding to four pixels including (i) two pixels provided in a longitudinal scanning direction, in each of which pixels sub-pixels indicative of red (R), blue (B), green (G), and white (W) are provided in this order counterclockwise and (ii) two pixels provided in a longitudinal scanning direction, in each of which pixels sub-pixels indicative of blue (B), red (R), white (W), and green (G) are provided in this order counterclockwise, the pixels (i) and (ii) being provided in a lateral scanning direction, said driving device including reversal control means for performing polarity reversal drive with respect to every one dot in a lateral scanning direction and for performing polarity reversal drive with respect to every one lateral line in a longitudinal scanning direction.

Further, in order to solve the foregoing problems, a method of the present invention for driving a display panel is a method for driving a display panel in which a pixel including sub-pixels indicative of red (R), green (G), blue (B) and at least one other color includes a plurality of sub-pixels at least in a longitudinal scanning direction, and a color filter is provided for each of the sub-pixels, the color filters constituting one block corresponding to four pixels including (i) two pixels provided in a longitudinal scanning direction, in each of which pixels sub-pixels indicative of red (R), blue (B), green (G), and white (W) are provided in this order counterclockwise and (ii) two pixels provided in a longitudinal scanning direction, in each of which pixels sub-pixels indicative of blue (B), red (R), white (W), and green (G) are provided in this order counterclockwise, the pixels (i) and (ii) being provided in a lateral scanning direction, said method comprising the step of performing polarity reversal drive with respect to every one dot in a lateral scanning direction and of performing polarity reversal drive with respect to every one lateral line in a longitudinal scanning direction.

Note that, the size of one dot is equal to that of two pixels in a lateral direction. The size of one lateral line is equal to one sub-pixel in a longitudinal direction.

With the invention, the color filters constitute one block corresponding to four pixels including (i) two pixels provided in a longitudinal scanning direction, in each of which pixels sub-pixels indicative of red (R), blue (B), green (G), and white (W) are provided in this order counterclockwise and (ii) two pixels provided in a longitudinal scanning direction, in each of which pixels sub-pixels indicative of blue (B), red (R), white (W), and green (G) are provided in this order counterclockwise, the pixels (i) and (ii) being provided in a lateral scanning direction. The color filters have an arrangement desirable for improving luminance.

With the color filters having the arrangement, one frame includes + polarity and − polarity with respect to each color and a next frame includes + polarity and − polarity with respect to each color, even if polarity reversal drive is performed with respect to every one dot in a lateral scanning direction and polarity reversal drive is performed with respect to every one lateral line in a longitudinal scanning direction as with conventional examples. As a result, the present invention is not designed such that each color is emphasized or not with respect to each frame. Instead, the present invention is designed such that each frame averagely includes a portion where color is emphasized and a portion where color is not emphasized, resulting in each frame displaying average brightness of the color in a whole screen.

At that time, lateral streaks which are parallel in a lateral scanning direction are not generated, but there is a possibility that longitudinal streaks which are parallel in a longitudinal scanning direction may be generated. Consequently, the present invention provides the driving device for the display panel and the method for driving the display panel, each of which allows for reducing flickers which are caused because color is emphasized or not in a whole screen compared with conventional examples, although flicker are not completely prevented.

Further, the display panel of the present invention is driven by the driving device of the present invention for a display panel.

With the invention, it is possible to provide a display panel capable of preventing flickers which are caused because color is emphasized or not in a whole screen.

Further, the display device of the present invention includes the driving device of the present invention for a display panel.

With the invention, it is possible to provide a display device capable of preventing flickers which are caused because color is emphasized or not in a whole screen.

Additional objects, features, and strengths of the present invention will be made clear by the description below. Further, the advantages of the present invention will be evident from the following explanation in reference to the drawings.

BRIEF DESCRIPTION OF DRAWINGS

FIG. 8(a) is a plan drawing showing a structure of color filters which constitute one bock corresponding to a 2×2 sub-pixel matrix pattern arrangement.

FIG. 8(b) is a plan drawing showing other structure of color filters which constitute one block corresponding to a 2×2 sub-pixel matrix pattern arrangement.

FIG. 8(c) is a plan drawing showing further other structure of color filters which constitute one block corresponding to a 2×2 sub-pixel matrix pattern arrangement.

FIG. 9(a) is a plan drawing showing a structure of color filters which constitute one block corresponding to a 2×3 sub-pixel matrix pattern arrangement.

FIG. 9(b) is a plan drawing showing other structure of color filters which constitute one block corresponding to a 2×3 sub-pixel matrix pattern arrangement.

FIG. 9(c) is a plan drawing showing further other structure of color filters which constitute one block corresponding to a 2×3 sub-pixel matrix pattern arrangement.

FIG. 9(d) is a plan drawing showing further other structure of color filters which constitute one block corresponding to a 2×3 sub-pixel matrix pattern arrangement.

FIG. 9(e) is a plan drawing showing further other structure of color filters which constitute one block corresponding to a 2×3 sub-pixel matrix pattern arrangement.

FIG. 9(f) is a plan drawing showing further other structure of color filters which constitute one block corresponding to a 2×3 sub-pixel matrix pattern arrangement.

FIG. 11(a) is a plan drawing showing color filters which constitute one block corresponding to a 4×4 pixel matrix pattern arrangement in which four pixels are provided, each of the four pixels including sub-pixels provided in a 2×2 matrix pattern.

FIG. 11(b) is a plan drawing showing other color filters which constitute one block corresponding to 4×4 pixel matrix pattern arrangement in which four pixels are provided, each of the four pixels including sub-pixels provided in a 2×2 matrix pattern.

FIG. 11(c) is a plan drawing showing further other color filters which constitute one block corresponding to 4×4 pixel matrix pattern arrangement in which four pixels are provided, each of the four pixels including sub-pixels provided in a 2×2 matrix pattern.

FIG. 12(a) is a plan drawing showing color filters which constitute one block corresponding to a 4×4 pixel matrix pattern arrangement in which four pixels are provided, each of the four pixels including sub-pixels provided in a 2×3 matrix pattern.

FIG. 12(b) is a plan drawing showing other color filters which constitute one block corresponding to 4×4 pixel matrix pattern arrangement in which four pixels are provided, each of the four pixels including sub-pixels provided in a 2×3 matrix pattern.

FIG. 12(c) is a plan drawing showing further other color filters which constitute one block corresponding to 4×4 pixel matrix pattern arrangement in which four pixels are provided, each of the four pixels including sub-pixels provided in a 2×3 matrix pattern.

FIG. 13(a) is a plan drawing showing color filters which constitute one block corresponding to 4×4 pixel matrix pattern arrangement in which four pixels are provided, each of the four pixels including sub-pixels provided in a 2×3 matrix pattern so that colors of the sub-pixels are positioned differently.

FIG. 13(b) is a plan drawing showing other color filters which constitute one block corresponding to 4×4 pixel matrix pattern arrangement in which four pixels are provided, each of the four pixels including sub-pixels provided in a 2×3 matrix pattern so that colors of the sub-pixels are positioned differently.

FIG. 13(c) is a plan drawing showing further other color filters which constitute one block corresponding to 4×4 pixel matrix pattern arrangement in which four pixels are provided, each of the four pixels including sub-pixels provided in a 2×3 matrix pattern so that colors of the sub-pixels are positioned differently.

BEST MODE FOR CARRYING OUT THE INVENTION

Embodiment 1

The following explains an embodiment of the present invention with reference to FIGS. 1 to 13.

Figure 1:
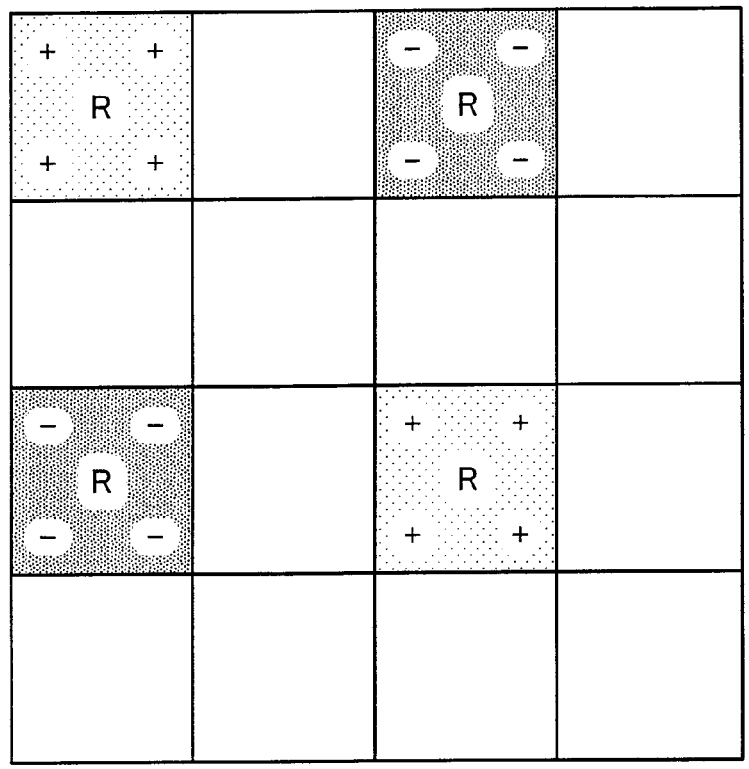
FIG. 1(a) is a plan drawing showing how each red (R) is displayed in one frame by a driving device of the present invention for a liquid crystal display panel.
FIG. 1(b) is a plan drawing showing how each red (R) is displayed in a subsequent frame by the driving device for the liquid crystal display panel.
Figure 1:
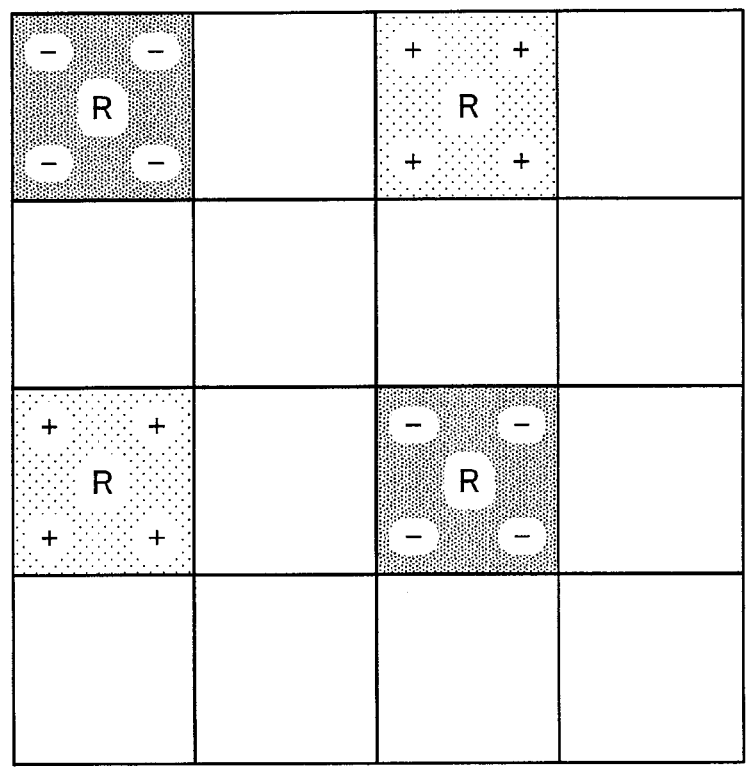
Figure 2:
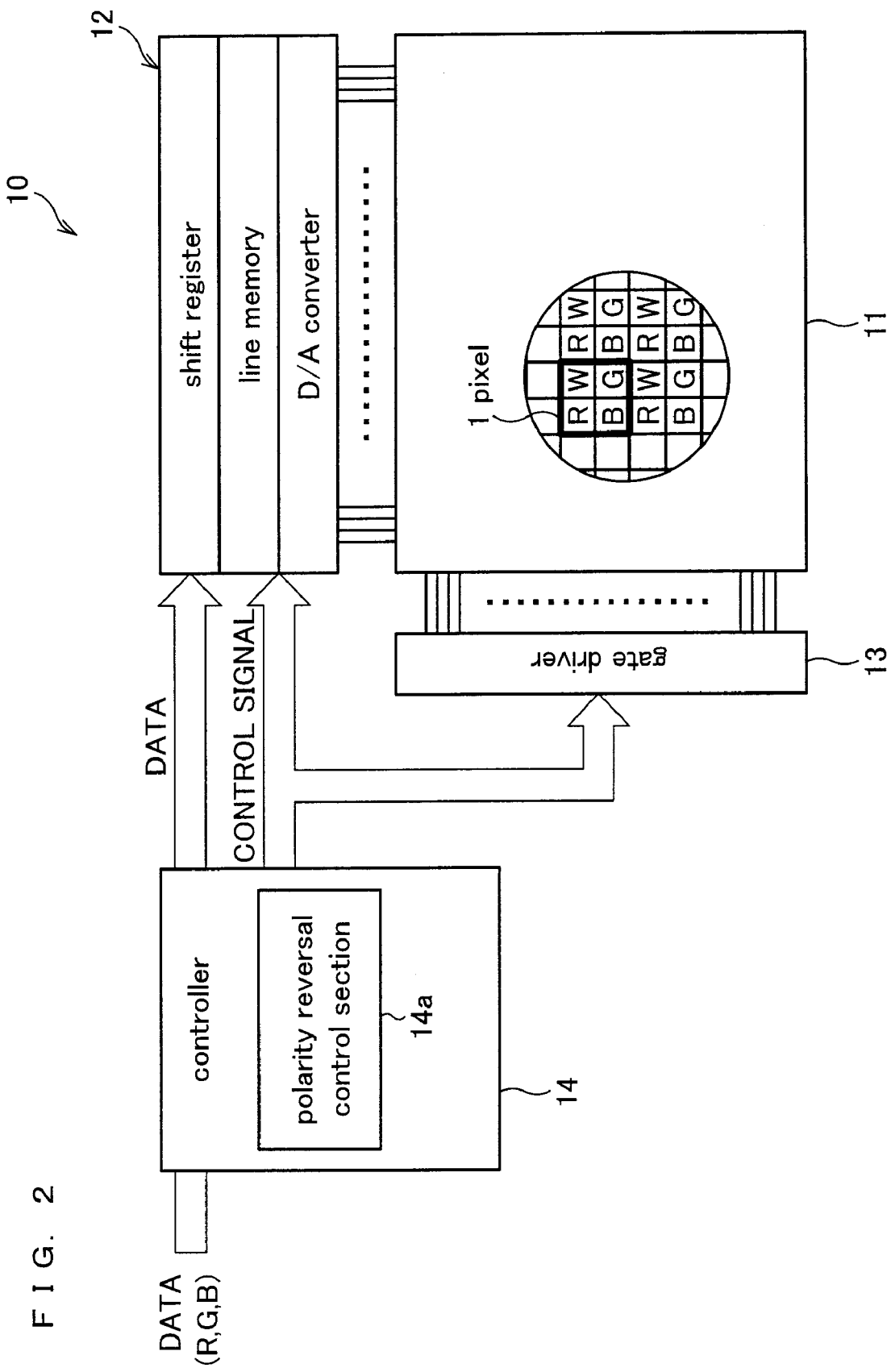
FIG. 2 is a block diagram showing a structure of the driving device.

As shown in FIG. 2, a liquid crystal display device which is a display device of the present embodiment includes: a liquid crystal display panel 11 serving as a display panel; a source driver 12 including a shift register, a line memory, a D/A converter and other members; a gate driver 13; and a controller 14. The above means except for the liquid crystal display panel 11 constitute a driving device 10 of the present invention for a display panel.

Figure 3:
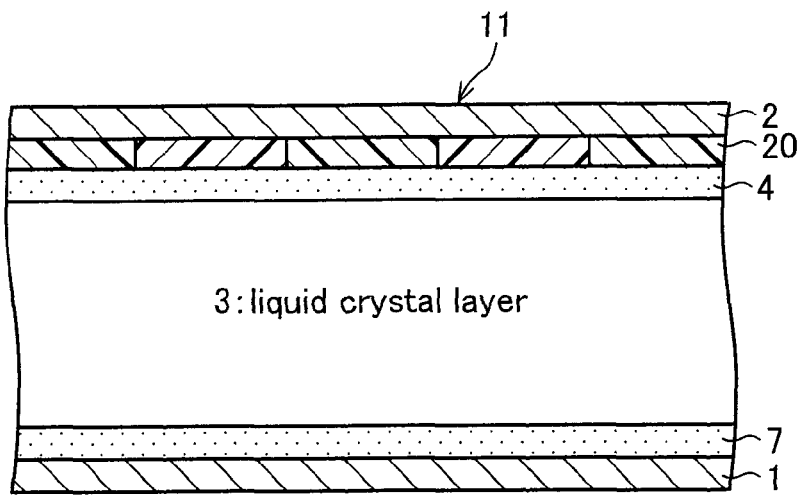
FIG. 3 is a cross sectional drawing showing a structure of the liquid crystal display panel.
Figure 4:
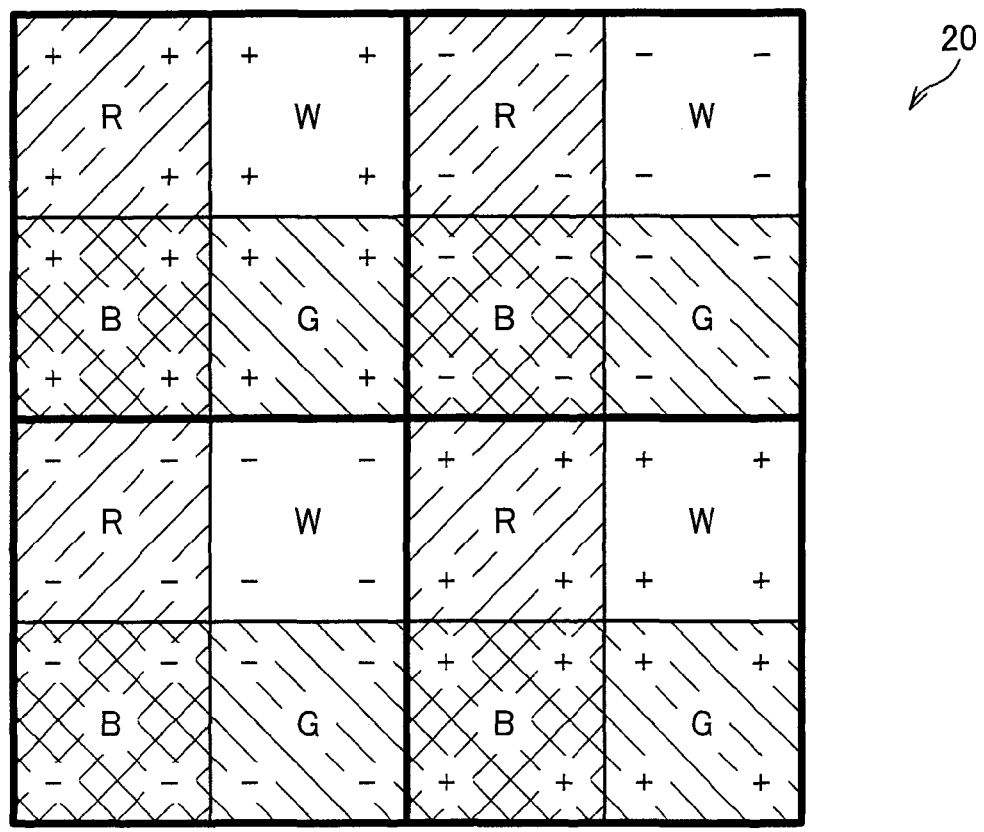
FIG. 4 is a plan drawing showing a structure of color filters used in the liquid crystal display panel.
Figure 5:
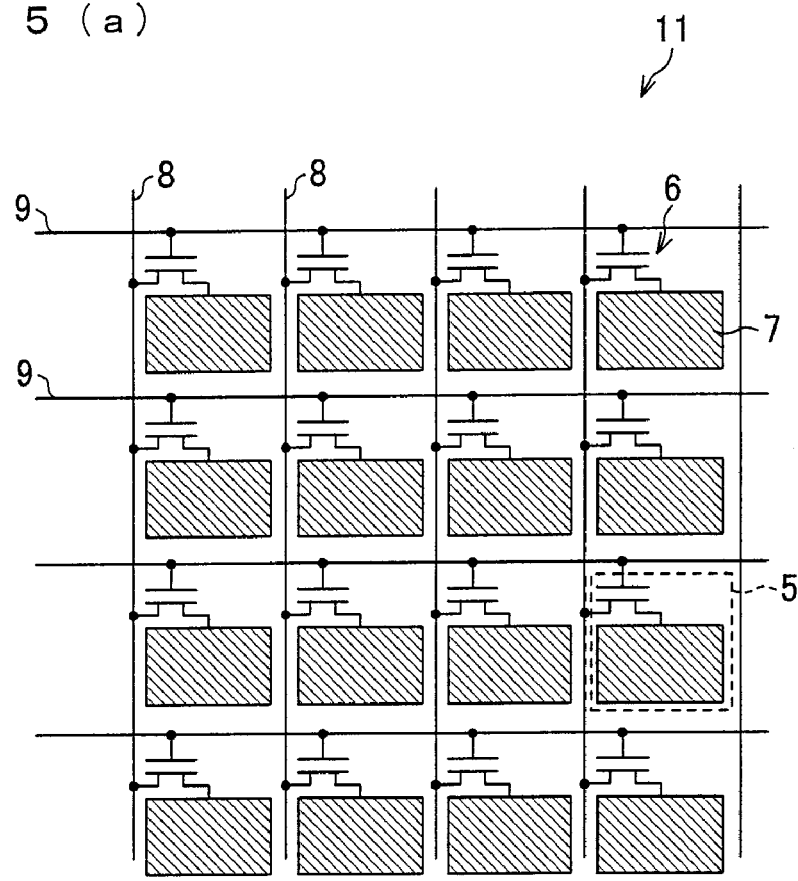
FIG. 5(a) is a plan drawing showing a structure of the liquid crystal display panel.
FIG. 5(b) is a circuit diagram showing a structure of a TFT provided in a sub-pixel.
Figure 5:
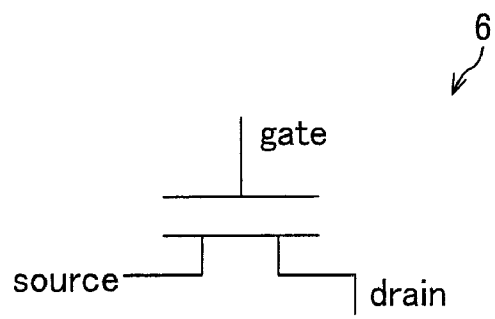

As schematically shown in FIG. 3, the liquid crystal display panel 11 includes a sandwich structure in which a liquid crystal layer 3 exists between a TFT (Thin Film Transistor) glass substrate 1 and a counter glass substrate 2. Color filters 20 and a counter electrode 4 are laminated on the counter glass substrate 2. In the present embodiment, as shown in FIG. 4, the color filters 20 constitute one block which corresponds to four pixels including two pixels in a longitudinal scanning direction and two pixels in a horizontal scanning direction, each of the four pixels including sub-pixels indicative of red (R), blue (B), green (G) and white (W) provided in this order counterclockwise.

On the other hand, as shown in FIGS. 5(a) and 5(b), the TFT glass substrate 1 includes a TFT element 6 with respect to each sub-pixel 5. A drain of the TFT element 6 is connected with a pixel electrode 7.

A source line 8 for supplying a data voltage to the TFT element 6 and a gate line 9 for turning on the TFT element 6 are provided longitudinally and laterally, respectively, on the TFT glass substrate 1. The source line 8 and the gate line 9 are connected with a source and a gate, respectively, of the TFT element 6. When a voltage of the gate line 9 is high, the TFT element 6 is turned on, and a voltage of the source line 8 is applied on the pixel electrode 7 on the drain side. When a gate voltage is low, the gate is turned off, and the pixel electrode 7 maintains its potential.

Figure 6:
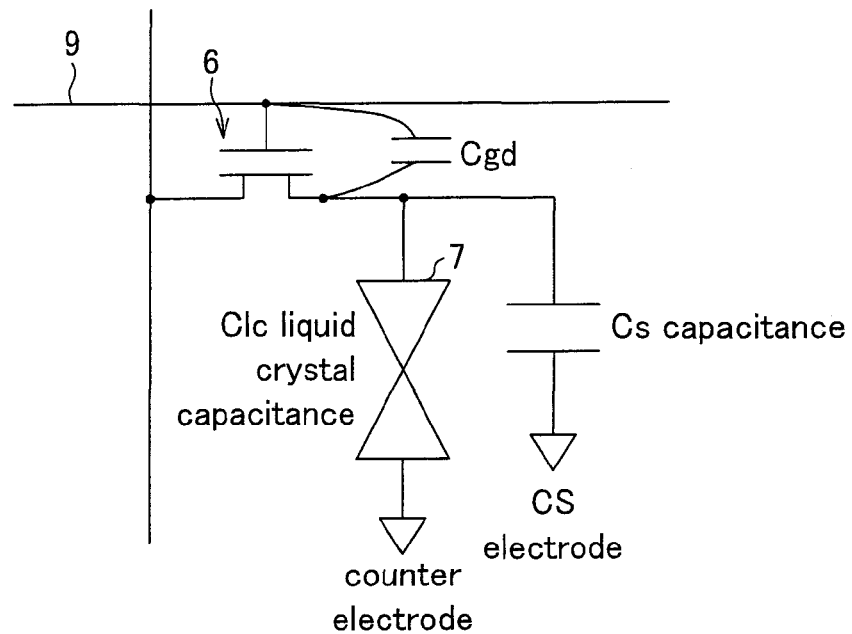
FIG. 6 is a drawing showing a parasitic capacitance generated between a gate and a drain of the TFT.

Here, as shown in FIG. 6, a parasitic capacitance Cgd exists between the gate and the drain of the TFT element 6. Consequently, when the gate of the TFT element 6 is turned off, a pixel voltage is led in (a pixel voltage decreases) by $$\Delta V = Cgd/(Clc+Ccs+Cgd) \times Vgh$$

due to the parasitic capacitance Cgd. Here, Clc is a capacitance of a liquid crystal, Ccs is a capacitance of Cs, and Vgh is a difference in voltage between a gate High and a gate Low.

Figure 7:
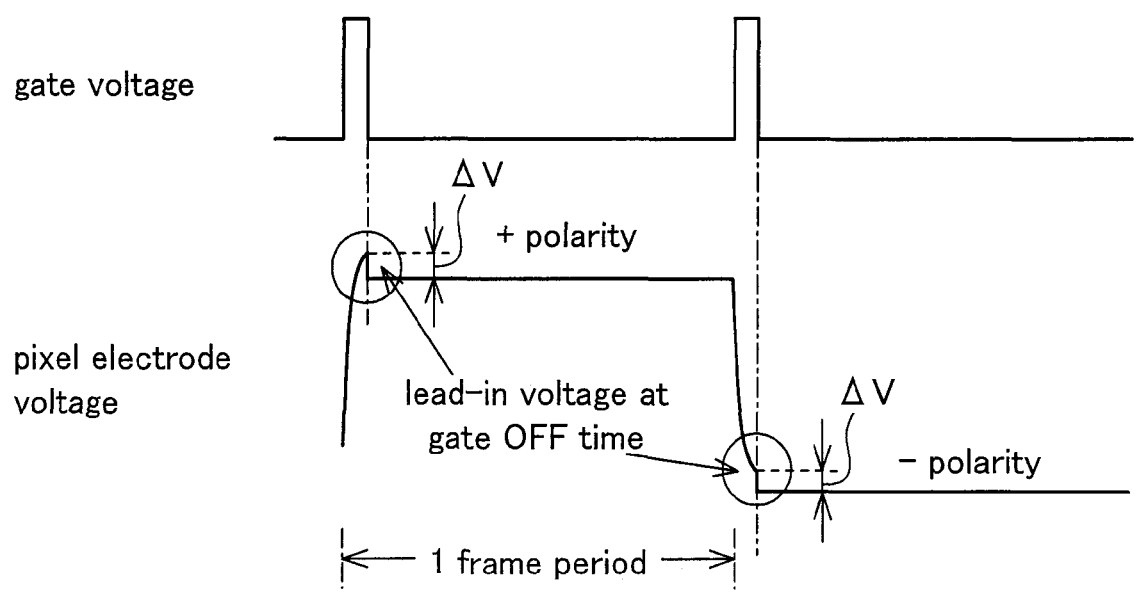
FIG. 7 is a waveform drawing showing a lead-in voltage due to the parasitic capacitance generated between the gate and the drain of the TFT.

Therefore, as shown in FIG. 7, a voltage applied on the pixel electrode is lower by ΔV than a written voltage (voltage supplied to a data signal line).

Consequently, as explained in PROBLEMS TO BE SOLVED BY THE INVENTION, when polarity of a liquid crystal is reversed with respect to every one dot and with respect to every one lateral line, flickers are generated in a whole screen.

For that reason, two-dot and two-lateral-line reversal drive or one-dot and two-lateral-line reversal drive is performed in the present embodiment.

The two-dot and two-lateral-line reversal drive or the one-dot and two-lateral-line reversal drive is performed by a polarity reversal control section 14a serving as reversal control means in the controller 14, which is shown in FIG. 2. The controller 14 supplies, to the source driver 12 and the gate driver 13, control signals such as the polarity reversal signal or a clock signal and data signals including red (R), green (G), and blue (B) signals.

The following explains a reversal control of a polarity of the liquid crystal layer 3 which control is performed by the driving device 10 for the liquid crystal display panel 11 having the above structure.

As shown in FIG. 4, the two-dot and two-lateral-line reversal drive for example is performed in the present embodiment. See a sub-pixel indicative of red (R) for example. As shown in FIG. 1(a), as a result of the polarity reversal drive, a sub-pixel indicative of red (R) having + polarity and a sub-pixel indicative of red (R) having − polarity are provided checkerwise in one block in which pixels are provided in a 2×2 matrix pattern. Consequently, in a case of +polarity, an absolute value of a voltage applied on a liquid crystal is 3V for example due to a lead-in voltage, while in a case of − polarity, an absolute value of a voltage applied on a liquid crystal is 4V for example due to the lead-in voltage. As a result, both thin red (R) and deep red (R) exist in a whole screen in one frame. This is recognized by human eyes as brightness of average red (R) between thin red (R) and deep red (R).

On the other hand, as shown in FIG. 1(b), in a next frame, the sub-pixel 5 having + polarity in the previous frame becomes a sub-pixel 5 having − polarity, while the sub-pixel 5 having − polarity in the previous frame becomes a sub-pixel 5 having +polarity. Consequently, a sub-pixel indicative of red (R) having + polarity and a sub-pixel indicative of red (R) having − polarity are provided checkerwise.

Therefore, in the next frame, too, both thin red (R) and deep red (R) exist in a whole screen. This is recognized by human eyes as brightness of average red (R) between thin red (R) and deep red (R). As a result, flickers do not exist.

As described above, the driving device 10 of the present embodiment for the liquid crystal display panel 11, the liquid crystal display panel 11 of the present embodiment, a liquid crystal display device of the present embodiment including the driving device 10, and the method of the present embodiment for driving the liquid crystal display panel 11 are designed such that: two-dot and N-lateral line polarity reversal drive or one-dot and N-lateral line polarity reversal drive is performed in a display panel in which a pixel including sub-pixels 5 indicative of red (R), green (G), blue (B) and at least one other color includes N (N is an integer of two or more) sub-pixels at least in a longitudinal scanning direction and a color filter is provided for each of the sub-pixels. The size of one dot is equal to that of one pixel.

In this way, the present embodiment is not designed such that each color is emphasized or not with respect to each frame. Instead, the present embodiment is designed such that each frame averagely includes a portion where color is emphasized and a portion where color is not emphasized, resulting in each frame displaying average brightness of the color in a whole screen. Consequently, it is possible to provide a driving device for the liquid crystal display panel 11 and a method for driving the liquid crystal display panel 11, each of which allows for preventing flickers which are caused because color is emphasized or not in a whole screen.

In the above explanation, the color filters 20 constitute one block which corresponds to four pixels including two pixels in a longitudinal scanning direction and two pixels in a lateral scanning direction, each of the four pixels including sub-pixels indicative of red (R), blue (B), green (G) and white (W) provided in this order counterclockwise, as shown in FIG. 4. Alternatively, the color filters 20 may be as follows.

That is, the color filters 20 may be color filters which constitute one block corresponding to a pixel in which sub-pixels are provided in a 2×2 matrix pattern. The sub-pixels may be indicative of red (R), green (G), blue (B), and yellow (Y) as shown in FIG. 8(a), may be indicative of red (R), green (G), blue (B), and cyan (CN) as shown in FIG. 8(b), or may be indicative of red (R), green (G), blue (B), and magenta (M) as shown in FIG. 8(c). Note that, if white (W) is replaced with other color, a balance of white changes. For that reason, it is desirable to adjust color of a backlight so as to use luminance effectively. For example, if white (W) is replaced with yellow (Y), color of a backlight is adjusted to be blue. If white (W) is replaced with magenta (M), there is little effect for improving brightness.

Further, the color filters 20 which constitute one block corresponding to a pixel in which sub-pixels are provided in 2×3 matrix pattern are possible in the present embodiment. For example, as shown in FIGS. 9(a) to 9(f), the sub-pixels may be indicative of red (R), green (G), blue (B), yellow (Y), white (W), and cyan (CN).

Further, as color filters which constitute one block corresponding to a 2×2 pixel matrix pattern arrangement including four pixels in each of which pixels four sub-pixels indicative of red (R), green (G), blue (B), and white (W) are provided, the color filters 20 may constitute one block which corresponds to four pixels including (i) two pixels provided in a longitudinal scanning direction, in each of which pixels sub-pixels of red (R), blue (B), green (G), and white (W) are provided in this order counterclockwise, and (ii) two pixels provided in a longitudinal scanning direction, in each of which pixels sub-pixels of blue (B), red (R), white (W), and green (G) are provided in this order counterclockwise, the pixels (i) and (ii) being provided in a lateral scanning direction. As color filters constitute one block which corresponds to four pixels having the above combinations, the color filters 20 have a pattern arrangement which lays weight on balance of luminance.

Such pattern arrangement may be combined with other colors. For example, in a case of four colors, the arrangement may be one shown in FIGS. 11(a) to 11(c).

Further, in a case of six colors, as shown in FIGS. 12(a) to 12(c), the color filters 20 may constitute one block which corresponds to a 4×4 pixel matrix pattern arrangement in which four pixels shown in FIGS. 9(a) to 9(f) are provided.

Further, as color filters which constitute one block corresponding to a 4×4 pixel matrix pattern arrangement including four pixels in each of which sub-pixels indicative of red (R), green (G), blue (B), yellow (Y), white (W), and cyan (CN) are provided, the color filters 20 may be one shown in FIGS. 13(*a*) to 13(*c*) for example. In this case, FIG. 13(*a*) is preferable to FIG. 12(*a*), FIG. 13(*b*) is preferable to FIG. 12(*b*), and FIG. 13(*c*) is preferable to FIG. 12(*c*) in terms of resolution. Further, FIGS. 12(*b*) and 12(*c*) are preferable to FIG. 12(*a*) in terms of balance of luminance. FIGS. 13(*b*) and 13(*c*) are preferable to FIG. 13(*b*) in terms of a balance of luminance. Further, a difference between FIGS. 12(*b*) and 12(*c*) is in whether desirable red color is provided in a longitudinal direction or in a lateral direction. The same can be said about a difference between FIGS. 13(*b*) and 13(*c*). Mirror image patterns of them are also included in the present invention.

Figure 10:
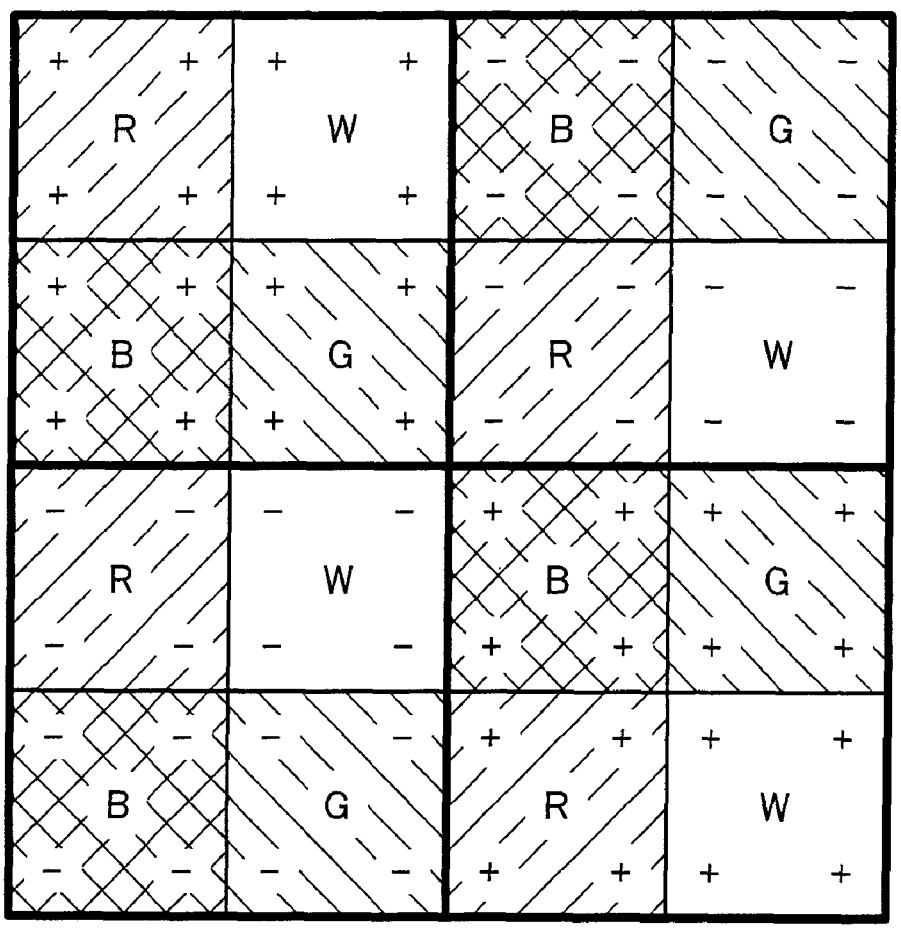
FIG. 10 is a plan drawing showing color filters which constitute one block corresponding to four pixels including (i) two pixels provided in a longitudinal scanning direction, in each of which pixels sub-pixels indicative of red (R), blue (B), green (G), and white (W) are provided in this order counterclockwise and (ii) two pixels provided in a longitudinal scanning direction, in each of which pixels sub-pixels indicative of blue (B), red (R), white (W), and green (G) are provided in this order counterclockwise, the pixels (i) and (ii) being provided in a lateral scanning direction.

Note that, with respect to (i) the color filters 20 which constitute one block corresponding to one pixel in which sub-pixels are provided in a 2×2 matrix pattern as shown in FIGS. 8(*a*) to 8(*c*) and (ii) the color filters 20 which constitute one block corresponding to four pixels in each of which colors are provided in an identical manner, one-dot and two-lateral-line reversal drive can be performed. On the other hand, with respect to the color filters 20 which constitute one block corresponding to four pixels in each of which colors are provided in different manners as shown in FIGS. 10 and 11(*a*) to 11(*c*), two-dot and two-lateral-line reversal drive is preferable.

The same can be said about the color filters 20 which constitute one block corresponding to one pixel in which sub-pixels are provided in a 2×3 matrix pattern.

That is, with respect to (i) the color filters 20 which constitute one block corresponding to one pixel in which sub-pixels are provided in a 2×3 matrix pattern as shown in FIGS. 9(*a*) to 9(*c*), and (ii) the color filters 20 which constitute one pixel corresponding to four pixels in each of which colors are provided in an identical manner as shown in FIGS. 12(*a*) to 12(*c*), one-dot and two-lateral-line reversal drive can be performed. On the other hand, with respect to the color filters 20 which constitute one block corresponding to four pixels in each of which colors are provided in different manners as shown in FIGS. 13(*a*) to 13(*c*), two-dot and two-lateral-line reversal drive is preferable.

As described above, the driving device 10 of the present embodiment for the liquid crystal display panel 11, the liquid crystal display panel 11 of the present embodiment, the liquid crystal display device of the present embodiment including the driving device 10, and the method of the present embodiment for driving the display panel 11 are designed such that each color filter of the color filters 20 are provided for each of even-numbered kinds of sub-pixels constituting one pixel.

In addition to input signals indicative of red (R), green (G), and blue (B), an input signal indicative of other color is inputted, so that it is possible to improve luminance. In improving luminance, the present embodiment is arranged so that one pixel includes even-numbered kinds of sub-pixels 5. That is, in order that luminance is improved in a case where one pixel includes N (N is an integer of two or more) sub-pixels at least in a longitudinal scanning direction, it is preferable for one pixel to include even-numbered sub-pixels 5.

In the driving device 10 of the present embodiment for the liquid crystal display panel 11, each color filter of the color filters 20 are provided for each of the sub-pixels 5 provided in a 2×2 matrix pattern which constitutes one pixel, so that it is possible to prevent flickers which are caused because color is emphasized or not emphasized in a whole screen.

Further, with respect to the color filters 20 corresponding to one pixel in which sub-pixels indicative of red (R), green (G), blue (B), and white (W) are provided in a 2×2 matrix pattern, the driving device 10 of the present embodiment for the liquid crystal display panel 11 allows for preventing flickers which are caused because color is emphasized or not emphasized in a whole screen. Addition of a sub-pixel indicative of white (W) is generally performed for improving luminance. With respect to a 2×2 sub-pixel matrix pattern arrangement with such addition, it is possible to prevent flickers which are caused because color is emphasized or not in a whole screen. Therefore, the present invention is applicable to many purposes. In a case where the color filters constitute one block corresponding to one pixel, or in a case where the color filters constitute one block corresponding to four pixels in each of which colors are provided in an identical manner, one-dot and two-lateral-line reversal drive can be performed. In a case where the color filters constitute one block corresponding to four pixels in each of which colors are provided in different manners, two-dot and two-lateral-line reversal drive is preferable.

Further, with respect to the color filters 20 each provided for each of sub-pixels indicative of red (R), green (G), blue (B), and yellow (Y) provided in a 2×2 matrix pattern constituting one pixel, the driving device 10 of the present embodiment for the liquid crystal display panel 11 allows for preventing flickers which are caused because color is emphasized or not in a whole screen.

Further, with respect to the color filters each provided for each of sub-pixels indicative of red (R), green (G), blue (B), and cyan (CN) provided in a 2×2 matrix pattern constituting one pixel, the driving device 10 of the present embodiment for the liquid crystal display panel 11 allows for preventing flickers which are caused because color is emphasized or not in a whole screen.

Further, with respect to the color filters 20 each provided for each of sub-pixels indicative of red (R), green (G), blue (B), white (W), yellow (Y), blue (B) and cyan (CN) provided in a 2×3 matrix pattern constituting one pixel, the driving device 10 of the present embodiment for the liquid crystal display panel 11 allows for preventing flickers which are caused because color is emphasized or not in a whole screen. In a case where the color filters constitute one block corresponding to one pixel and in a case where the color filters constitute one block corresponding to four pixels in each of which colors are provided in an identical manner, one-dot and two-lateral-line reversal drive can be performed. In a case where the color filters constitute one block corresponding to four pixels in each of which colors are provided in different manners, two-dot and two-lateral-line reversal drive is preferable.

Further, the driving device 10 of the present embodiment for the liquid crystal display panel 11 uses the color filters 20 each provided for each of the sub-pixels 5 included in each of four pixels provided in a 2×2 matrix pattern. Consequently, it is possible to display images in consideration of a balance of luminance and to prevent flickers which are caused because color is emphasized or not in a whole screen.

Further, the driving device 10 of the present embodiment for the liquid crystal display panel 11 uses the color filters 20 constituting one block which corresponds to four pixels including (i) two pixels provided in a longitudinal scanning direction, in each of which pixels sub-pixels 5 indicative of red (R), blue (B), green (G), and white (W) are provided in this order counterclockwise and (ii) two pixels provided in a longitudinal scanning direction, in each of which pixels sub-pixels 5 indicative of blue (B), red (R), white (W), and green (G) are provided in this order counterclockwise, the pixels (i) and (ii) being provided in a lateral scanning direction. Consequently, with one-dot and two-lateral-line reversal drive, or preferably with two-dot and two-lateral-line reversal drive, it is possible to display images in consideration of a balance of luminance and to prevent flickers which are caused because color is emphasized or not in a whole screen.

Embodiment 2

Figure 14:
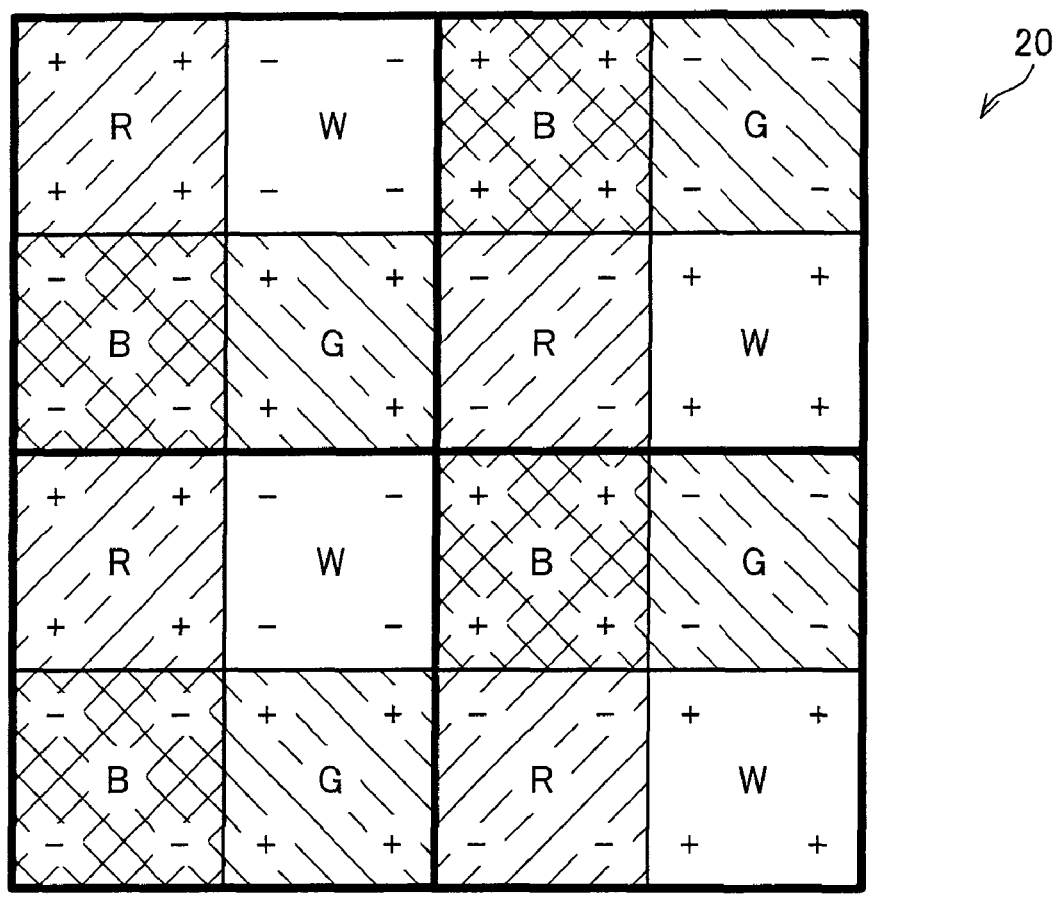
FIG. 14 is a plan drawing of a one-dot and one-lateral line reversal drive using color filters which constitute one block corresponding to four pixels including (i) two pixels provided in a longitudinal scanning direction, in each of which pixels red (R), blue (B), green (G), and white (W) are provided in this order counterclockwise, and (ii) two pixels provided in a longitudinal scanning direction, in each of which pixels blue (B), red (R), white (W), and green (G) are provided in this order counterclockwise, the pixels (i) and (ii) being provided in a lateral scanning direction.
Figure 15A:
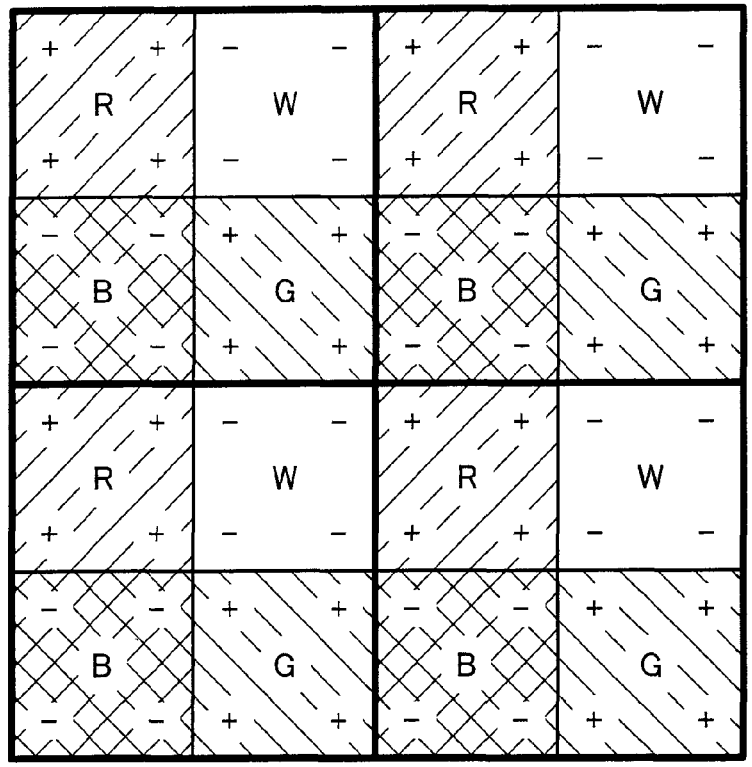
FIG. 15(a) is a plan drawing showing conventional color filters which constitute one block corresponding to 4×4 pixel matrix pattern arrangement in which four pixels are provided, each of the four pixels including four sub-pixels indicative of red (R), green (G), blue (B), and white (W) provided in a 2×2 matrix pattern.
Figure 15B:
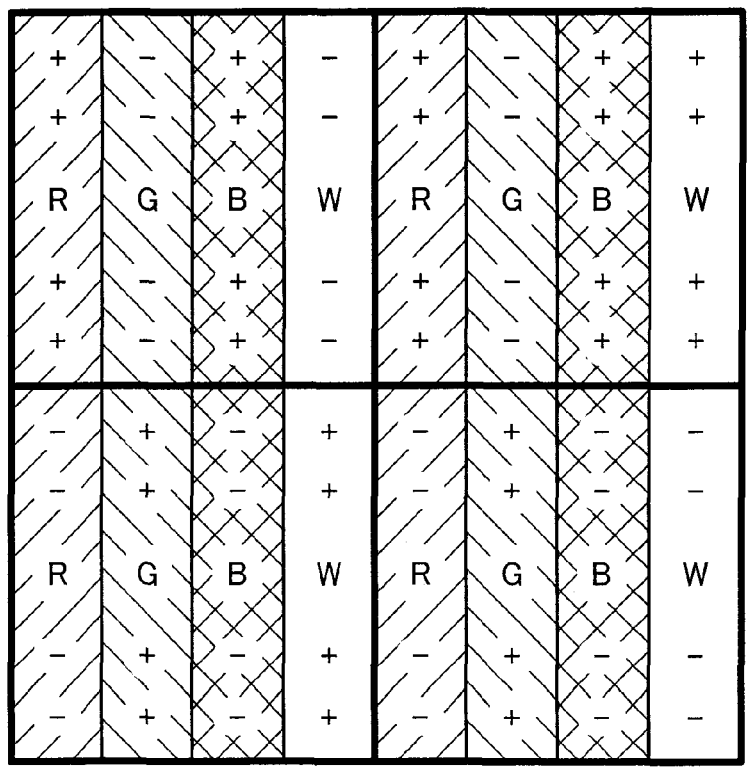
FIG. 15(b) is a plan drawing showing conventional color filters which constitute one block corresponding to 4×4 pixel matrix pattern arrangement in which four pixels are provided, each of the four pixels including four sub-pixels indicative of red (R), green (G), blue (B), and white (W) provided in a stripe pattern.
Figure 16A:
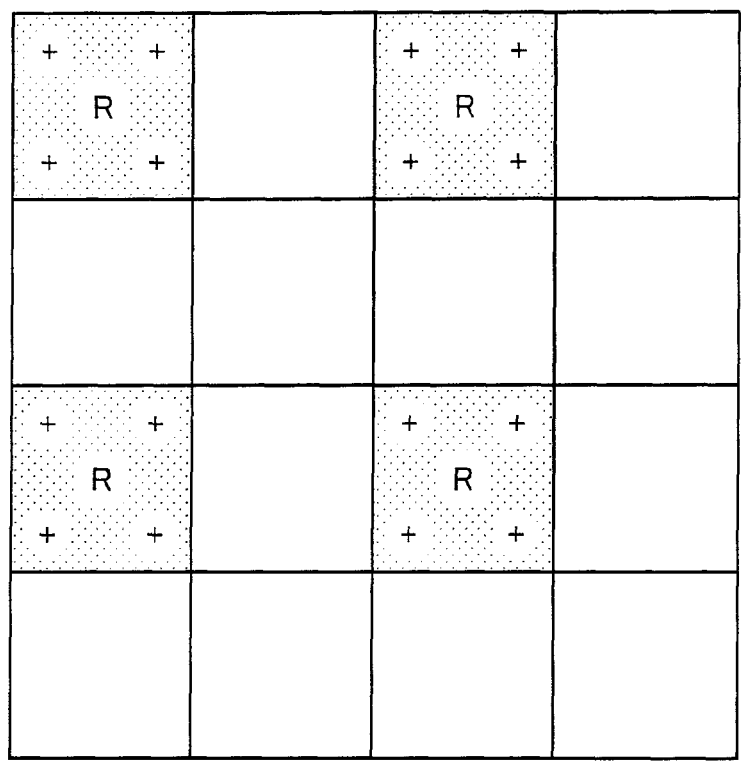
FIG. 16(a) is a plan drawing how each red (R) is displayed in one frame in a case where one-dot and one-lateral line reversal drive is performed using the color filters in FIG. 15(a).
Figure 16B:
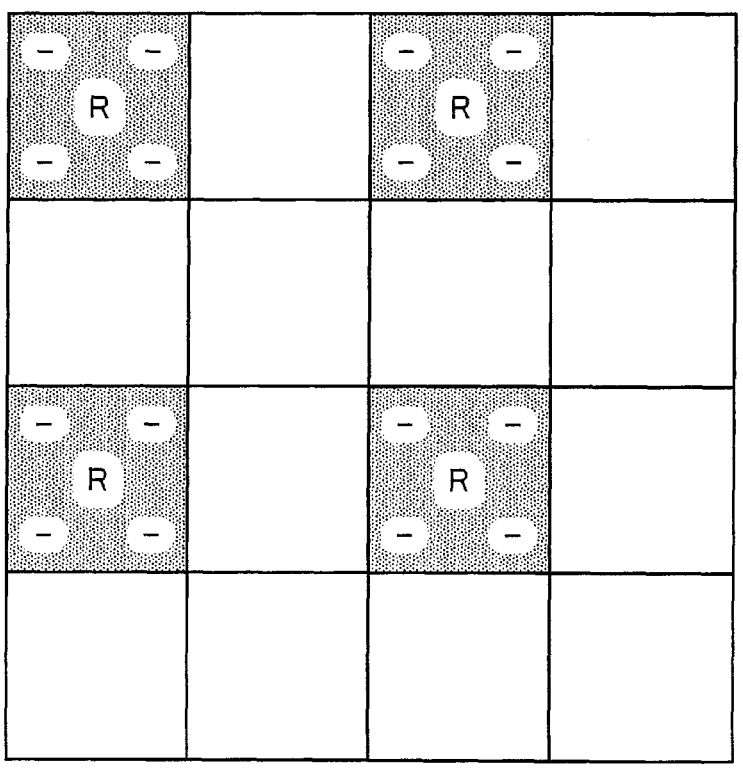
FIG. 16(b) is a plan drawing how each red (R) is displayed in a next frame in a case where one-dot and one-lateral line reversal drive is performed using the color filters in FIG. 15(a).

The following explains another embodiment of the present invention with reference to FIG. 14. Note that, arrangements other than arrangements explained in the present embodiment are the same as those in Embodiment 1. For convenience of explanation, members having the same functions as members shown in drawings of Embodiment 1 are given the same signs and explanations thereof will be omitted here.

As shown in FIG. 14, as with Embodiment 1, a driving device 10 of the present embodiment for a liquid crystal display panel 11 and a liquid crystal display device including the driving device 10 uses color filters 20 which constitute one block corresponding to four pixels including (i) two pixels provided in a longitudinal scanning direction, in each of which pixels sub-pixels indicative of red (R), blue (B), green (G), and white (W) are provided in this order counterclockwise and (ii) two pixels provided in a longitudinal scanning direction, in each of which pixels sub-pixels indicative of blue (B), red (R), white (W), and green (G) are provided in this order counterclockwise, the pixels (i) and (ii) being provided in a lateral scanning direction.

However, in the present embodiment, as shown in FIG. 14, one-dot and one-lateral line polarity reversal drive is performed.

With this method, longitudinal streaks become half of those in conventional examples, so that it is possible to reduce flickers compared with conventional examples, although flickers are not completely prevented.

Further, when one-dot and one-lateral line polarity reversal drive is performed with respect to the color filters 20 having color arrangements shown in FIGS. 10 and 11(a) to 11(c) of Embodiment 1, longitudinal streaks become half of those in conventional examples. Therefore, it is possible to reduce flickers compared with conventional examples, although flickers are not completely prevented.

This method has such merit that a controller 14 of the driving device 10 for the liquid crystal display panel 11 may perform conventional one-dot and one-lateral line polarity reversal drive, so that it is unnecessary to modify the controller 14.

As described above, the driving device 10 of the present embodiment for the liquid crystal display panel 11 uses the color filters 30 which constitute one block corresponding to four pixels including (i) two pixels provided in a longitudinal scanning direction, in each of which pixels sub-pixels 5 indicative of red (R), blue (B), green (G), and white (W) are provided in this order counterclockwise and (ii) two pixels provided in a longitudinal scanning direction, in each of which pixels sub-pixels 5 indicative of blue (B), red (R), white (W), and green (G) are provided in this order counterclockwise, the pixels (i) and (ii) being provided in a lateral scanning direction.

The color filters 30 have color arrangements which are desirable for improving luminance. When the color filters 30 having the color arrangements are subjected to conventional polarity reversal drive in which polarity is reversed with respect to every one dot in a lateral scanning direction and polarity is reversed with respect to every one lateral line in a longitudinal scanning direction, one frame has both + polarity and − polarity with respect to each color. A next frame has both + polarity and − polarity with respect to each color, too. Consequently, the present embodiment is not designed such that each color is emphasized or not with respect to each frame. Instead, the present embodiment is designed such that each frame averagely includes a portion where color is emphasized and a portion where color is not emphasized, resulting in each frame displaying average brightness of the color in a whole screen.

In the present embodiment, lateral streaks which are parallel in a lateral scanning direction are not generated, but there is a possibility that longitudinal streaks which are parallel in a longitudinal scanning direction may be generated. Consequently, the present embodiment provides the driving device 10 for the liquid crystal display panel 11 and the method for driving the liquid crystal display panel 11, each of which allows for reducing flickers which are caused because color is emphasized or not in a whole screen compared with conventional examples, although flicker are not completely prevented.

Further, the present embodiment provides the liquid crystal display panel 11 capable of preventing flickers which are caused because color is emphasized or not in a whole screen.

Further, the present embodiment provides the liquid crystal display device capable of preventing flickers which are caused because color is emphasized or not in a whole screen.

As described above, the driving device of the present invention for the display panel uses color filters each provided for each of even-numbered kinds of sub-pixels constituting one pixel.

With the invention, each color filter is provided for each of even-numbered kinds of sub-pixels constituting one pixel. That is, in addition to input signals indicative of red (R), green (G), and blue (B), an input signal indicative of other color is added, so that it is possible to improve luminance.

In improving luminance, the present invention is designed such that one pixel includes even-numbered kinds of sub-pixels. That is, in order that luminance is improved in a case where one pixel includes N (N is an integer of two or more) sub-pixels at least in a longitudinal scanning direction, it is preferable for one pixel to include even-numbered sub-pixels.

The driving device of the present invention for the liquid crystal display panel uses the color filters each provided for each of sub-pixels provided in a 2×2 matrix pattern which constitutes one pixel.

With the invention, when each of the color filters is provided for each of sub-pixels provided in a 2×2 matrix pattern which constitutes one pixel, it is possible to prevent flickers which are caused because color is emphasized or not in a whole screen.

Further, the driving device of the present invention for the display panel uses the color filters each provided for each of sub-pixels indicative of red (R), green (G), blue (B), and white (W).

With respect to the color filters each provided for each of sub-pixels indicative of red (R), green (G), blue (B), and white (W) provided in a 2×2 matrix pattern which constitutes one pixel, the invention provides the driving device for the liquid crystal display panel which allows for preventing flickers which are caused because color is emphasized or not in a whole screen.

Further, addition of a sub-pixel indicative of white (W) is generally performed for improving luminance. With respect to a 2×2 sub-pixel matrix pattern arrangement with such addition, it is possible to prevent flickers which are caused because color is emphasized or not in a whole screen. Therefore, the present invention is applicable to many purposes.

Further, the driving device of the present invention for the display panel uses the color filters each provided for each of sub-pixels indicative of red (R), green (G), blue (B), and yellow (Y).

With respect to the color filters each provided for each of sub-pixels indicative of red (R), green (G), blue (B), and yellow (Y) provided in a 2×2 matrix pattern which constitutes one pixel, the invention provides the driving device for the liquid crystal display panel which allows for preventing flickers which are caused because color is emphasized or not in a whole screen.

Further, the driving device of the present invention for the display panel uses the color filters each provided for each of sub-pixels indicative of red (R), green (G), blue (B), and cyan (CN).

With respect to the color filters each provided for each of sub-pixels indicative of red (R), green (G), blue (B), and cyan (CN) provided in a 2×2 matrix pattern which constitutes one pixel, the invention provides the driving device for the liquid crystal display panel which allows for preventing flickers which are caused because color is emphasized or not in a whole screen.

When at least one other color is added to red (R), green (G), and blue (B), it is most preferable to use white (W) in terms of an effect in improving luminance. However, as described above, a color other than white (W) may be added in terms of improving reproducibility of half tone colors and in terms of adjusting a balance of luminance in a pixel. In that case, white balance and colors capable of being displayed may vary in accordance with the added color. In order to compensate the variation, it is desirable to change a color tone of a backlight or other members and to adjust density of each color filter. The present invention calculates output gradation, including the adjustment.

Further, the driving device of the present invention for the display panel uses the color filters each provided for each of sub-pixels indicative of red (R), green (G), blue (B), white (W), yellow (Y), blue (B), and cyan (CN) provided in a 2×3 matrix pattern. 2×3 represents 2 lines and 3 columns.

With respect to the color filters each provided for each of sub-pixels indicative of red (R), green (G), blue (B), white (W), yellow (Y), blue (B), and cyan (CN) provided in a 2×3 matrix pattern which constitutes one pixel, the present invention provides the driving device for the liquid crystal display panel which allows for preventing flickers which are caused because color is emphasized or not in a whole screen.

Further, the driving device of the present invention for the display panel uses the color filters which constitute one block corresponding to four pixels provided in a 2×2 matrix pattern.

Using the color filters each provided for each of sub-pixels included in each of four pixels provided in a 2×2 matrix pattern, the invention provides the driving device for the display panel which allows for a display in consideration of a balance of luminance and allows for preventing flickers which are caused because color is emphasized or not in a whole screen.

Further, the driving device of the present invention for the display panel uses the color filters which constitute one block corresponding to four pixels including (i) two pixels provided in a longitudinal scanning direction, in which pixels sub-pixels indicative of red (R), blue (B), green (G), and white (W) are provided in this order counterclockwise and (ii) two pixels provided in a longitudinal scanning direction, in which pixels sub-pixels indicative of blue (B), red (R), white (W), and green (G) are provided in this order counterclockwise, the pixels (i) and (ii) being provided in a lateral scanning direction.

Using the color filters which constitute one block corresponding to four pixels including (i) two pixels provided in a longitudinal scanning direction, in which pixels sub-pixels indicative of red (R), blue (B), green (G), and white (W) are provided in this order counterclockwise and (ii) two pixels provided in a longitudinal scanning direction, in which pixels sub-pixels indicative of blue (B), red (R), white (W), and green (G) are provided in this order counterclockwise, the pixels (i) and (ii) being provided in a lateral scanning direction, the present invention provides the driving device for the display panel which allows for a display in consideration of a balance of luminance and allows for preventing flickers which are caused because color is emphasized or not in a whole screen.

Further, the display device of the present invention includes a liquid crystal display element as a display element.

With the invention, it is possible to provide a liquid crystal display device capable of preventing flickers which are caused because color is emphasized or not in a whole screen.

INDUSTRIAL APPLICABILITY

The present invention is applicable to a driving device for driving a plurality of display elements and to a display device including the driving device. Specifically, the present invention is applicable to an active matrix liquid crystal display device for example. The present invention is applicable to displays such as an electrophoretic display, a twisting ball display, a reflective display using a micro prism film, and a display using an optical modulation element such as a digital mirror device. Further, the present invention is applicable to a display using a light-emitting element capable of varying luminance emitted from the element, such as an organic EL light-emitting element, an inorganic EL light-emitting element, and an LED (Light Emitting Diode). Further, the present invention is applicable to a field emission display (FED) and a plasma display.

The invention claimed is:

1. A driving device for a display panel in which a pixel including sub-pixels indicative of red (R), green (G), blue (B) and at least one other color includes N (N is an integer of two or more) sub-pixels at least in a longitudinal scanning direction, and a color filter is provided for each of the sub-pixels,
said driving device including a reversal control device arranged to perform polarity reversal drive with respect to every two dots in a lateral scanning direction and to perform polarity reversal drive with respect to every N lateral lines in a longitudinal scanning direction, wherein
the color filters constitute one block corresponding to four pixels including (i) two pixels provided in a longitudinal scanning direction, in each of which pixels sub-pixels indicative of red (R), blue (B), green (G), and yellow (Y) are provided in this order counterclockwise and (ii) two pixels provided in a longitudinal scanning direction, in each of which pixels sub-pixels indicative of blue (B), red (R), yellow (Y), and green (G) are provided in this order counterclockwise, the pixels (i) and (ii) being provided in a lateral scanning direction.

2. A driving device for a display panel in which a pixel including sub-pixels indicative of red (R), green (G), blue (B) and at least one other color includes a plurality of sub-pixels at least in a longitudinal scanning direction, and a color filter is provided for each of the sub-pixels, the color filters constituting one block corresponding to four pixels including (i) two pixels provided in a longitudinal scanning direction, in each of which pixels sub-pixels indicative of red (R), blue (B), green (G), and yellow (Y) are provided in this order counterclockwise and (ii) two pixels provided in a longitudinal scanning direction, in each of which pixels sub-pixels indicative of blue (B), red (R), yellow (Y), and green (G) are provided in this order counterclockwise, the pixels (i) and (ii) being provided in a lateral scanning direction, said driving device including a reversal control device arranged to perform polarity reversal drive with respect to every one dot in a lateral scanning direction and to perform polarity reversal drive with respect to every one lateral line in a longitudinal scanning direction.

3. A display panel, driven by a driving device for a display panel in which a pixel including sub-pixels indicative of red (R), green (G), blue (B) and at least one other color includes a plurality of sub-pixels at least in a longitudinal scanning direction, and a color filter is provided for each of the sub-pixels, the color filters constituting one block corresponding to four pixels including (i) two pixels provided in a longitudinal scanning direction, in each of which pixels sub-pixels indicative of red (R), blue (B), green (G), and yellow (Y) are provided in this order counterclockwise and (ii) two pixels provided in a longitudinal scanning direction, in each of which pixels sub-pixels indicative of blue (B), red (R), yellow (Y), and green (G) are provided in this order counterclockwise, the pixels (i) and (ii) being provided in a lateral scanning direction, said driving device including a reversal control device arranged to perform polarity reversal drive with respect to every one dot in a lateral scanning direction and to perform polarity reversal drive with respect to every one lateral line in a longitudinal scanning direction.

4. A display device, including a driving device for a display panel in which a pixel including sub-pixels indicative of red (R), green (G), blue (B) and at least one other color includes a plurality of sub-pixels at least in a longitudinal scanning direction, and a color filter is provided for each of the sub-pixels, the color filters constituting one block corresponding to four pixels including (i) two pixels provided in a longitudinal scanning direction, in each of which pixels sub-pixels indicative of red (R), blue (B), green (G), and yellow (Y) are provided in this order counterclockwise and (ii) two pixels provided in a longitudinal scanning direction, in each of which pixels sub-pixels indicative of blue (B), red (R), yellow (Y), and green (G) are provided in this order counterclockwise, the pixels (i) and (ii) being provided in a lateral scanning direction, said driving device including a reversal control device arranged to perform polarity reversal drive with respect to every one dot in a lateral scanning direction and to perform polarity reversal drive with respect to every one lateral line in a longitudinal scanning direction.

5. The display device as set forth in claim 4, further comprising a liquid crystal display element as a display element.

6. A method for driving a display panel in which a pixel including sub-pixels indicative of red (R), green (G), blue (B) and at least one other color includes a plurality of sub-pixels at least in a longitudinal scanning direction, and a color filter is provided for each of the sub-pixels, the color filters constituting one block corresponding to four pixels including (i) two pixels provided in a longitudinal scanning direction, in each of which pixels sub-pixels indicative of red (R), blue (B), green (G), and yellow (Y) are provided in this order counterclockwise and (ii) two pixels provided in a longitudinal scanning direction, in each of which pixels sub-pixels indicative of blue (B), red (R), yellow (Y), and green (G) are provided in this order counterclockwise, the pixels (i) and (ii) being provided in a lateral scanning direction, said method comprising the step of performing polarity reversal drive with respect to every one dot in a lateral scanning direction and of performing polarity reversal drive with respect to every one lateral line in a longitudinal scanning direction.

* * * * *